United States Patent
Civelli et al.

(10) Patent No.: US 8,612,418 B2
(45) Date of Patent: Dec. 17, 2013

(54) MOBILE WEB BROWSER FOR PRE-LOADING WEB PAGES

(75) Inventors: Jay Pierre Civelli, Sunnyvale, CA (US); Arnaud Claude Weber, Saratoga, CA (US)

(73) Assignee: Google Inc., Mountain View, CA (US)

( * ) Notice: Subject to any disclaimer, the term of this patent is extended or adjusted under 35 U.S.C. 154(b) by 139 days.

(21) Appl. No.: 13/278,110

(22) Filed: Oct. 20, 2011

(65) Prior Publication Data

US 2013/0019159 A1     Jan. 17, 2013

Related U.S. Application Data

(60) Provisional application No. 61/508,006, filed on Jul. 14, 2011.

(51) Int. Cl.
    *G06F 17/00*     (2006.01)
(52) U.S. Cl.
    USPC ........... 707/708; 715/221; 715/224; 715/273; 707/713; 707/732
(58) Field of Classification Search
    USPC .......... 715/204, 221, 224, 273; 707/708, 713, 707/732
    See application file for complete search history.

(56) References Cited

U.S. PATENT DOCUMENTS

| | | | |
|---|---|---|---|
| 6,012,052 A * | 1/2000 | Altschuler et al. | 1/1 |
| 6,067,565 A * | 5/2000 | Horvitz | 709/218 |
| 6,564,213 B1 * | 5/2003 | Ortega et al. | 1/1 |
| 6,704,727 B1 * | 3/2004 | Kravets | 1/1 |
| 7,467,137 B1 * | 12/2008 | Wolfe | 1/1 |
| 7,747,749 B1 * | 6/2010 | Erikson et al. | 709/226 |
| 8,161,370 B2 * | 4/2012 | Nguyen | 715/206 |
| 8,370,329 B2 * | 2/2013 | Gutt et al. | 707/721 |
| 8,452,745 B2 * | 5/2013 | Ramakrishna | 707/705 |
| 8,452,791 B2 * | 5/2013 | Fortuna et al. | 707/765 |
| 2002/0023145 A1 * | 2/2002 | Orr et al. | 709/219 |
| 2003/0145087 A1 * | 7/2003 | Keller et al. | 709/226 |
| 2003/0212563 A1 * | 11/2003 | Ju et al. | 704/277 |
| 2003/0220913 A1 * | 11/2003 | Doganata et al. | 707/3 |
| 2004/0064577 A1 * | 4/2004 | Dahlin et al. | 709/235 |
| 2010/0174735 A1 * | 7/2010 | Fiatal | 707/769 |

OTHER PUBLICATIONS

Todd Bishop, 'Awesome Bar: Firefox next killer feature?', May 16, 2008, The Microsoft Blog SeattlePI http://blog.seattlepi.com/microsoft/2008/05/16/awesome-bar-firefoxs-next-killer-feature/.*

(Continued)

*Primary Examiner* — Stephen Hong
*Assistant Examiner* — Matthew Ludwig
(74) *Attorney, Agent, or Firm* — McDermott Will & Emery LLP (57) ABSTRACT

Computer-implemented methods for pre-loading a web page in a mobile web browser are provided. In one aspect, a method includes receiving a partial or complete query in a mobile web browser from a mobile device prior to the partial or complete query being submitted by a user and receiving an identification of a predicted web page responsive to the partial or complete query. The method also includes loading but not rendering the predicted web page prior to the partial or complete query being query being submitted by the user, and displaying the loaded and rendered predicted web page in the mobile web browser after the completed query is submitted by the user when the predicted web page is determined to be responsive to the submitted query. Systems, graphical user interfaces, and machine-readable media are also provided.

22 Claims, 5 Drawing Sheets

(56) References Cited

OTHER PUBLICATIONS

Darin Fisher, 'Link Prefetching', Mozilla Developer Network, Mar. 3, 2003.*

Mark Hachman, Google Chrome Beta Can Prerender Web Pages, Nov. 11, 2010, PC Magazine.*

Mahkovec, "Announcing Instant pages", Google Webmaster Central Blog, retrieved from <http:// googlewebmastercentral.blogspot.com/2011/06/announcing-instant-pages.html>, Jun. 14, 2011.

* cited by examiner

MOBILE WEB BROWSER FOR PRE-LOADING WEB PAGES

CROSS-REFERENCE TO RELATED APPLICATIONS

The present application claims priority benefit under 35 U.S.C. §119(e) from U.S. Provisional Application No. 61/508,006, filed Jul. 14, 2011, which is incorporated herein by reference in its entirety.

BACKGROUND

1. Field

The present disclosure generally relates to the transmission of data over a network, and more particularly to the use of a computing device to communicate over a network.

2. Description of the Related Art

Non-mobile computing devices such as desktop computer and laptop computers usually have faster computing speed and access to faster network connections than other types of computing devices. As a result, a user using a web browser on a non-mobile computing device (a "non-mobile web browser") is accustomed to faster web page loading and rendering times.

On the other hand, mobile computing devices, such as smartphones, have slower computing speeds and slower network access connections (e.g., to mobile data telecommunication networks) than non-mobile computing devices. As a result, when a user selects a web page to view on a web browser for a mobile device (a "mobile web browser"), the loading and display speed of the web page is slowed by the limited bandwidth and computing capacity of the mobile device. A user that is accustomed to faster loading and display times on non-mobile web browsers can find the slower load and display time of the web page on the mobile web browser to be frustrating.

SUMMARY

According to one aspect of the disclosure, a computer-implemented method for pre-loading a web page in a mobile web browser is disclosed. The method includes receiving a partial or complete query in a mobile web browser from a mobile device prior to the partial or complete query being submitted by a user and receiving an identification of a predicted web page responsive to the partial or complete query. The method also includes loading but not rendering the predicted web page prior to the partial or complete query being query being submitted by the user, and displaying the loaded and rendered predicted web page in the mobile web browser after the completed query is submitted by the user when the predicted web page is determined to be responsive to the submitted query.

According to another aspect of the disclosure, a system for pre-loading a web page in a mobile web browser is disclosed. The system includes a memory for storing a predicted web page responsive to a partial or complete query received in a mobile web browser from a mobile device, and a processor. The processor is configured to receive an identification of the predicted web page as responsive to the partial or complete query, and load but not render the predicted web page from a server based on the prediction prior to the query being completed and submitted. The processor is also configured to display the loaded and rendered predicted web page in the mobile web browser after the completed query is submitted by a user when the predicted web page is determined to be responsive to the submitted query.

According to a further aspect of the disclosure, a mobile web browser for pre-loading a web page in a mobile web browser is disclosed. The mobile web browser includes an input field configured to receive, from a mobile device, a submission of a partial or complete query for a web page for loading and rendering the predicted web page, and a web page display area configured to display a web page. The mobile web browser is configured to receive an identification of a predicted web page responsive to the partial or complete query prior to the partial or complete query being submitted by a user, load but not render the predict web page based on the prediction prior to the query being completed and submitted, and display the loaded and rendered predicted web page in the predicted web page display area after the completed query is submitted by the user to the input field when the predicted web page is determined to be responsive to the submitted query.

According to yet a further aspect of the disclosure, a machine-readable storage medium includes machine-readable instructions for causing a processor to execute a method for pre-loading a web page in a mobile web browser is disclosed. The method includes receiving a query in a mobile web browser from a mobile device prior to the query being submitted by a user, and receiving an identification of at least one predicted web page responsive to the query. The method also includes loading and rendering the at least one identified web page based on the prediction prior to the query being completed and submitted, and displaying the loaded and rendered at least one predicted web page in the mobile web browser after the completed query is submitted by the user when the predicted web page is determined to be responsive to the submitted query.

BRIEF DESCRIPTION OF THE DRAWINGS

The accompanying drawings, which are included to provide further understanding and are incorporated in and constitute a part of this specification, illustrate disclosed embodiments and together with the description serve to explain the principles of the disclosed embodiments. In the drawings.

DETAILED DESCRIPTION

In the following detailed description, numerous specific details are set forth to provide a full understanding of the present disclosure. It will be apparent, however, to one ordinarily skilled in the art that the embodiments of the present disclosure may be practiced without some of these specific details. In other instances, well-known structures and techniques have not been shown in detail so as not to obscure the disclosure.

The disclosed web browser, which can operate on a mobile or non-mobile device, automatically loads and renders one or many suggested web pages in the background ("pre-loading" and "pre-rendering") while a user is still selecting a web page to load. Specifically, as a user enters a query (e.g., a. URL, search request, or selection from history), the web browser automatically downloads and renders (e.g., prepares for display) one or many of the web pages the user will most likely select to load based on the query entered so far, based on the user's history or bookmarks, other users' histories, and other information relevant to predicting responses to web page queries. The loaded and rendered web page is not displayed until the user completes entry of the query. Thus, because the likely web page the user wants to see has already been pre-loaded and pre-rendered, when the user submits the query for the web page to the web browser (e.g., by pressing "enter" after inputting a search request or selecting a suggested web page from a list), the web browser displays the web page nearly instantly when the pre-loaded and pre-rendered web page matches the submitted user query. The near instant display of the web page in response to the submission makes it appear to the user that the web page was very quickly loaded and rendered, thereby improving the user's web browsing experience, especially on mobile devices having limited bandwidths.

For example, if a user enters "y" a web browser URL address bar, and the user's web browser history indicates that the user most likely wants to load the web page "www.yoursite.com," then the mobile web browser will display a list of suggested URLs or search queries responsive to the "y" and will begin downloading and rendering the webpage "www.yoursite.com". The webpage "www.yoursite.com" will not be displayed in the web browser until the user selects "www.yoursite.com" from the list of suggestions. When the user presses the "go" button in the mobile web browser to select "www.yoursite.com" or selects the suggestion from a list for loading and display, the web page for "www.yoursite.com" appears in the mobile web browser nearly instantly.

Although many examples provided herein describe a user's information, such as a user's web browser history, being stored in memory, the user can, at any time, delete the user information from memory and/or opt out of having the user information stored in memory. Additionally, the user can, at any time, adjust appropriate privacy settings to selectively limit the types of user information stored in memory. The user information does not include and/or share the specific identification of the user (e.g., the user's name) unless otherwise specifically provided or directed by the user.

Figure 1:
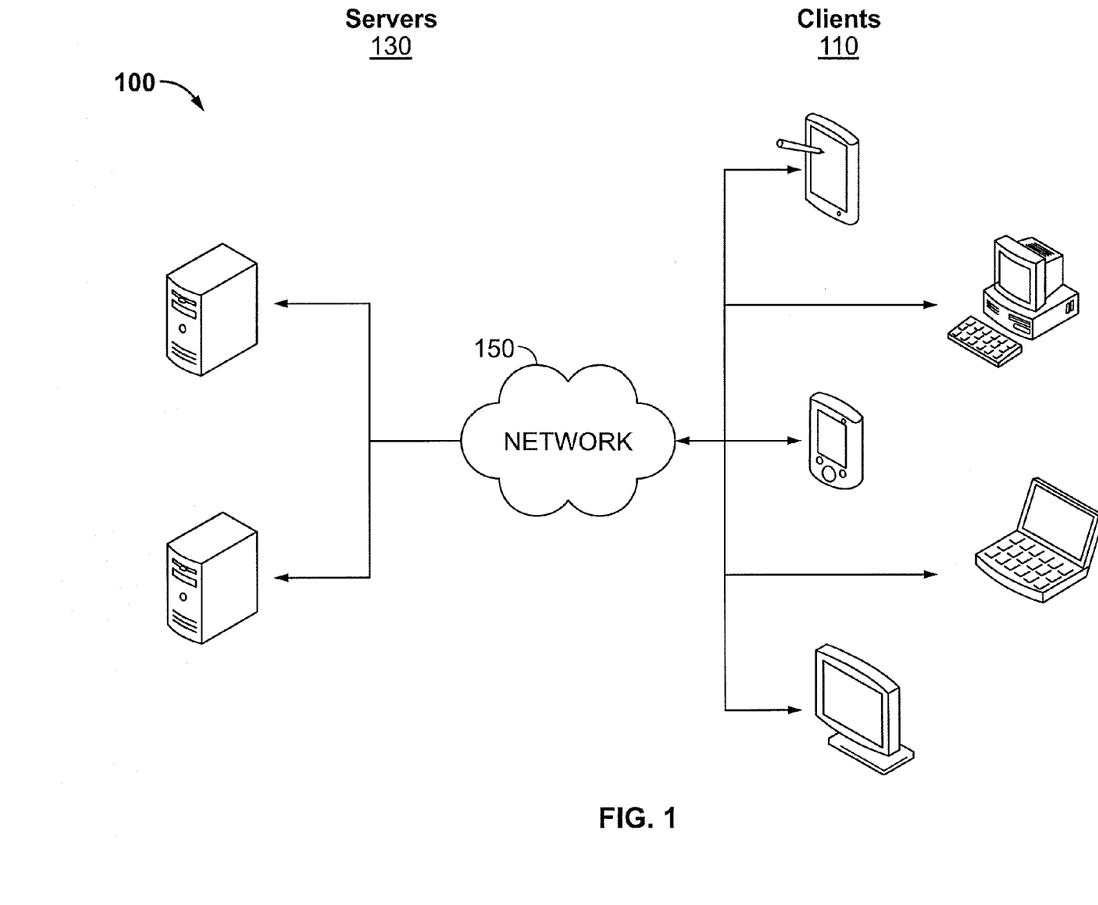
FIG. 1 illustrates an exemplary architecture for pre-loading a web page in a mobile web browser.

FIG. 1 illustrates an exemplary architecture 100 for pre-loading a web page in a mobile web browser. The architecture 100 includes servers 130 and clients 110 connected over a network 150.

Each of the clients 110 is configured to download, install, and run a web browser as disclosed herein. The web browser is configured to run on clients 110 that are mobile or non-mobile. The clients 110 can be, for example, desktop computers, laptop computers, mobile devices (e.g., a smartphone, tablet computer, or PDA), set top boxes (e.g., for a television), video game consoles, or any other devices having appropriate processor, memory, and communications capabilities. In certain aspects, certain advantages of the web browser, such as increased web page loading time in response to a query submission, are most salient on clients 110 that are mobile devices or that otherwise have slower processing and network data download speeds.

The web browser can be downloaded over the network 150 from one of the many servers 130. For purposes of load balancing, multiple servers 130 can also host the data for downloading the web browser. In certain instances, different versions and/or configurations of the web browser that include the features disclosed herein are available for download from a server 130 and subsequent installation depending on whether the client 110 is a mobile device or non-mobile device. The web browser, once installed on a client 110, is configured to load web pages from any one or multiple servers 130 hosting the web pages. The servers 130 can be any device having an appropriate processor, memory, and communications capability for hosting the data for installing the web browser and for hosting the web pages. The network 150 can include, for example, any one or more of a personal area network (PAN), a local area network (LAN), a campus area network (CAN), a metropolitan area network (MAN), a wide area network (WAN), a broadband network (BBN), the Internet, and the like. Further, the network 150 can include, but is not limited to, any one or more of the following network topologies, including a bus network, a star network, a ring network, a mesh network, a star-bus network, tree or hierarchical network, and the like.

The disclosed web browser, once downloaded from a server 130 and installed and executed on a client 110, is configured to receive a partial or complete query (e.g., partial query "y" or complete query "yoursite.com") from a user into an input field of the web browser. The input field (e.g., "omnibox") can be designated for entering a Uniform Resource Locator, a search query, or both. As the user enters the query, the web browser provides the partial or complete query to an appropriate server 130, in response to which the server 130 predicts web pages responsive to the query. The server 130 provides a list of the predicted web pages to the client 110, and the client 110 loads (from the appropriate server 130) and renders those responsive web pages in the background without indication to the user. Responsive web pages can include search suggestions (e.g., "Search for yoursite.com"), navigation suggestions "www.yoursite.com"), or a suggestion from a user's web browsing history or bookmarks. The prediction is based on the user's history, bookmarks, other users' history, and other information relevant to predicting responses to web page queries. As the user continues entry of the query, the web browser continues to provide updates to the query to the appropriate server 130, receive predicted web pages responsive to the updated query, and load (from the appropriate server 130) and render those responsive web pages in the background. By, the time the user decides to submit the query, the web page responsive to the query has already been loaded and rendered by the client 110 and is ready for display. When the user does submit the query, the web page appears nearly instantly to the user in the web browser on the client 110. As a result, the web browsing speed of the client 110 appears to be significantly increased to the user.

Figure 2:
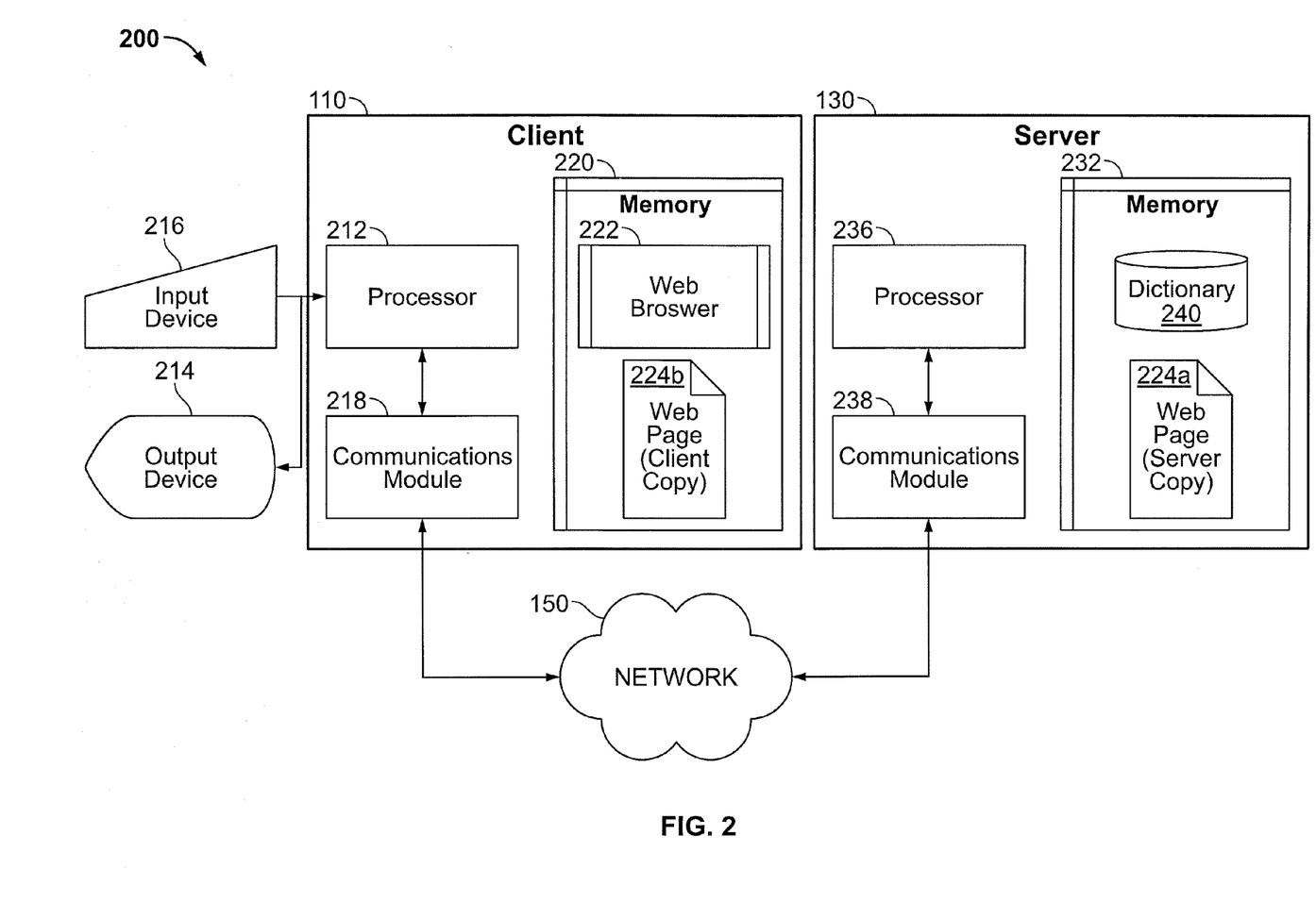
FIG. 2 is a block diagram illustrating an exemplary client and server from the architecture of FIG. 1 according to certain aspects of the disclosure.

FIG. 2 is a block diagram 200 illustrating an exemplary server 130 and client 110 in the architecture 100 of FIG. 1 according to certain aspects of the disclosure. The client and the server 130 are connected over the network 150 via respective communications modules 218 and 238. The communications modules 218 and 238 are configured to interface with the network 150 to send and receive information, such as data, requests, responses, and commands to other devices on the network. The communications modules 218 and 238 can be, for example, modems or Ethernet cards.

The client 110 includes a processor 212, the communications module 218, and a memory 220 that includes a web browser 222 and a client copy of a web page 224b to display in the web browser 222 using the output device 214 (e.g., a display) of the client 110. The client 110 also includes an input device 216, such as a keyboard, touchscreen, or mouse, to receive user queries. The processor 212 of the client 110 is configured to execute instructions, such as instructions physically coded into the processor 212, instructions received from software in memory 240, or a combination of both. For example, the processor 212 of the client 110 executes instructions from the web browser 222 to receive (e.g., from a dictionary 240 on the server 130) an identification of one or many predicted web pages that are responsive to a partial or complete query received from a user of the client 110. The one or many web pages are identified with reference to the dictionary 240 stored in the memory 232 of the server 130 in response to the client 110 providing the partial or complete query to the server 130. Systems and methods for predicting one or many web pages responsive to a partial or complete query received from a user of a client are disclosed in U.S. patent application Ser. No. 10/875,143, filed on Jun. 22, 2004, titled "Anticipated Query Generation and Processing in a Search Engine," which is herein incorporated by reference in its entirety. Although the dictionary 240, which is discussed in the referenced application, is illustrated as stored in the memory 232 of the server 130, the dictionary 240 can be stored on any one or more other servers 130 illustrated in FIG. 1.

After identification by the processor 212 of the client 110 of a web page responsive to a partial or complete query, the processor 212 then downloads the identified web page 224a from the server 130 hosting the web page 224a prior to the user completing and submitting the query to the web browser 222 for loading and rendering. Specifically, the processor 222 of the client 110 sends a request to download the web page 224a from the communications module 218 of the client 110, over the network 150, to the communications module 238 of the server 130. The processor 236 of the server 130 receives the request and provides the requested web page 224a from memory 232 back to the client 110 over the network 150, and the client 110 stores a copy of the received web page 224b in memory 220. The processor 212 of the client 110 continues to provide the continuing entry of a partial query by the user to the server 130, and continues to receive identifications of one or many predicted web pages that are responsive to the continuing entry of a partial query by the user. The processor 212 of the client 110 also continues to request, download, and render those identified web pages.

The number of identified web pages that are selected by the web browser 222 on the client 110 for downloading from the server 130 prior to the user completing and submitting the query can depend on the memory requirements of the web pages and the client 110. For example, if the pre-loading and pre-rendering, of a web page will exceed a memory performance limit of the client 110 or the web browser 222, the web page will not be pre-loaded and pre-rendered. The processor 222 can also determine whether to download an identified web page 224a from the server prior to the user completing and submitting the query depending on the network connection of the client 110. For example, if the client's connection to the network 150 is an unlimited connection (e.g., a connection that does not charge based on an amount of data downloaded), such as a wireless local area network connection (e.g., WiFi) or an unlimited download mobile data telecommunication network pricing plan (e.g., "unlimited data plan"), then an identified web page can be downloaded prior to the user completing and submitting the query. On the other hand, if the connection to the network 150 is a limited connection (e.g., a connection that charges based on an amount of data downloaded), or if the web page is designated as excluded from pre-loading (e.g., if the web page contains sensitive information, is designated as malicious, or otherwise indicated by a user as undesired or web page owner as excluded), then an identified web page will not be downloaded for rendering prior to the user completing and submitting the query.

Once an identified web page 224a is downloaded from the server 130, a client copy of the loaded web page is stored in the memory 224b of the client 110. The client copy of the web page 224b can then be rendered (e.g., prepared for display) by the processor 212 after downloading but before the user query is completed and submitted. The processor 212 is configured to then display the loaded and rendered web page 224b in the web browser 222 after the user submits the completed query for loading and rendering to the web browser 222 if the web page 224b is responsive (e.g., matches) the submitted query. If the web page 224b contains active content, such as audio, video, scripts, or other load-time dependent content, then activation playback) of the active content can be delayed from the time the web page 224b is pre-rendered to the time the web page 224b is displayed in the web browser 222.

Figure 3:
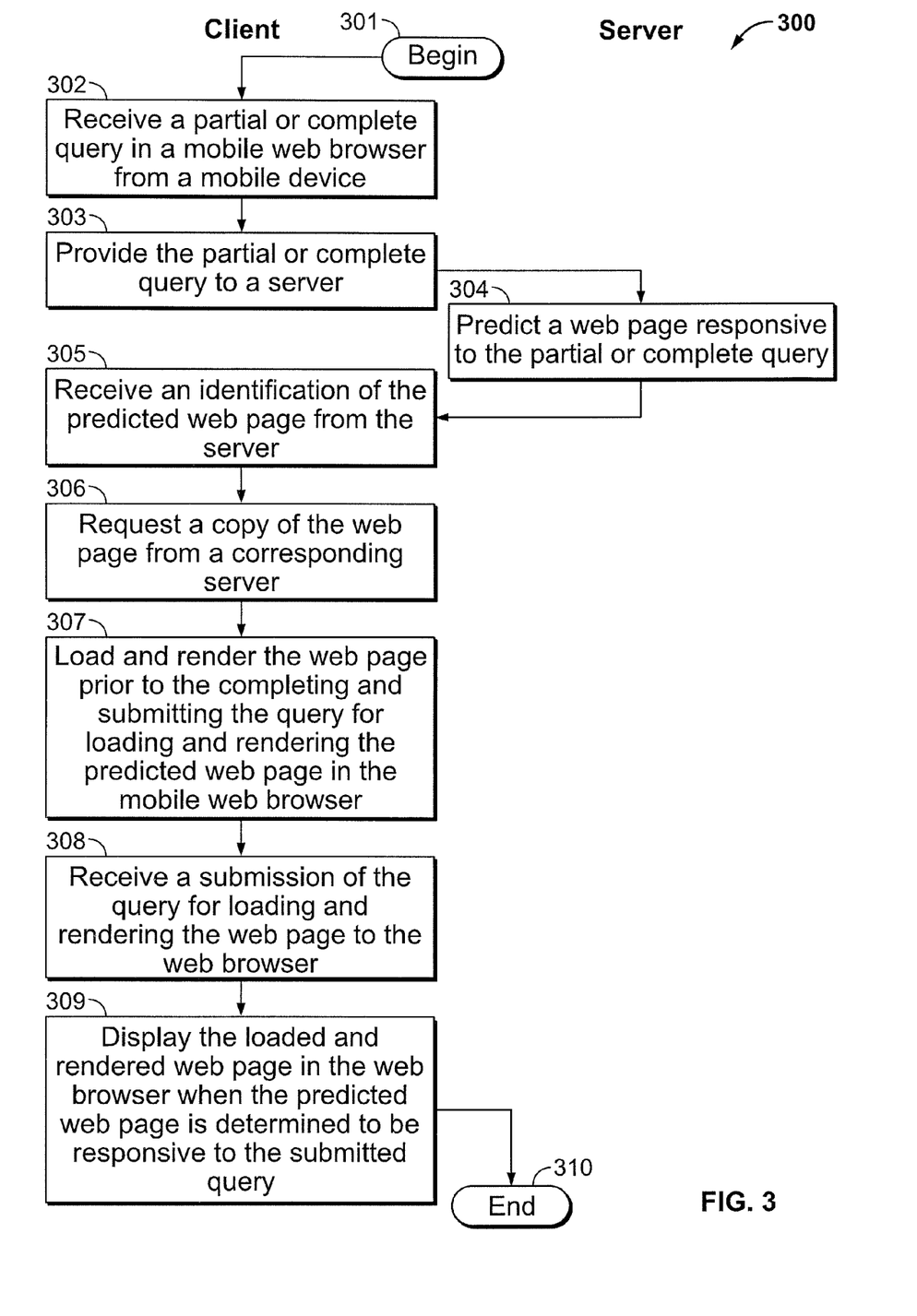
FIG. 3 illustrates an exemplary process for pre-loading a web page in a mobile web browser using the exemplary client and server of FIG. 2.

FIG. 3 illustrates an exemplary process 300 for pre-loading a web page in a mobile web browser using the exemplary client 110 and server 130 of FIG. 2. The process 300 begins by proceeding from step 301 when a user opens a web browser 222 to step 302 when an input field in the web browser 222 receives a partial or complete query from the user in step 303, before the user completes and submits the query, the web browser 222 provides the partial or complete query to a server 130, in response to which the server 130 in step 304 predicts one or many web pages responsive to the partial or complete query. In step 305, again before the user completes and submits the query, the web browser 222 receives an identification of the predicted web page and in step 306 requests a copy of the responsive web page(s) from a corresponding server hosting the web page. In step 307, the web browser 222 on the client 110 loads and renders the copy of the web page 224b. The web page 224b is loaded and rendered in step 307 prior to the user completing and submitting the user's query. In step 308, the web browser 222 receives a submission of the completed query from the user. The submission of the query by the user to the web browser 222 indicates to the web browser 222 that the user has selected a web page for loading, rendering, and display in the web browser 222. The pre-loaded and pre-rendered web page 224b, if responsive to the submitted query, is then displayed in the web browser 222 in step 309, and the process 300 ends.

FIG. 3 set forth an exemplary process 300 for pre-loading a web page in a mobile web browser using the exemplary client 110 and server 130 of FIG. 2. An example will now be described using the exemplary process 300 of FIG. 3, a smartphone client 110, a mobile web browser 222 on the smartphone 110, the partial query "y", and a responsive webpage from the website "www.yoursite.com."

Figure 4A:
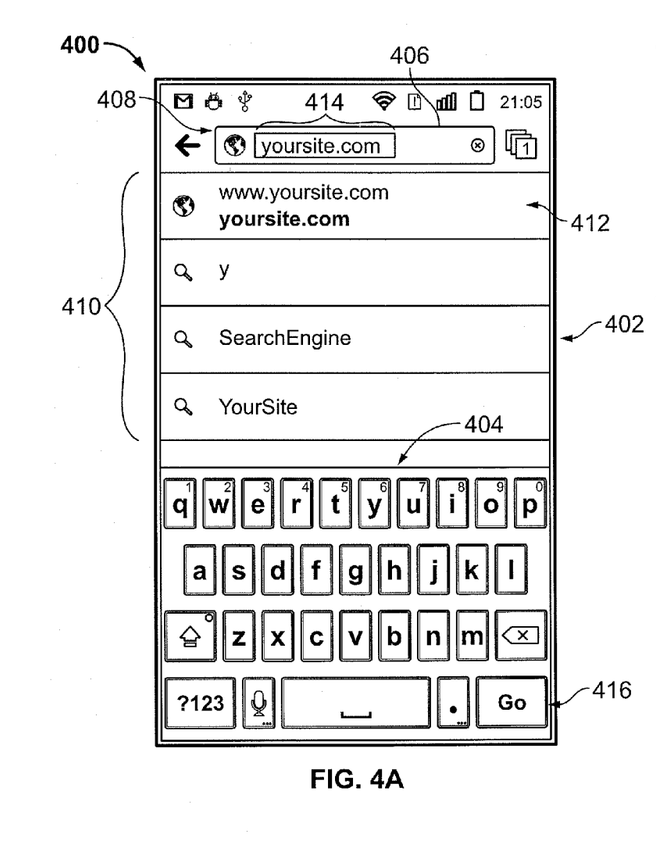
FIGS. 4A and 4B are exemplary screenshots associated with the exemplary process of FIG. 3.

With reference to FIG. 4A, which illustrates an exemplary screenshot 400 from the mobile web browser 222, the process 300 begins by proceeding from step 301 when a user opens the mobile web browser 222 on the user's smartphone 110 and a location page 402 is displayed. In step 302, the user enters the partial query "y" 408 into the omnibox 406 of the web browser 222. The user enters the partial query "y" by pressing the "y" key 404 on the touchscreen 214 and 216 of the smartphone 110. In response, the letter "y" 408 is entered into the omnibox 406 of the web browser 222. In step 303, the web browser provides the partial query "y" to a server 130, in response to which the server 130 in step 304 predicts, based on the user's history, bookmarks, other users' history, and other information relevant to predicting responses to web page queries, one or man web pages responsive to the partial query "y" 408. In step 305, the web browser 222 receives a list 410 of the responsive web pages (e.g., URLs for web pages or search queries for terms) and displays the list 410 in the web browser 222. The foremost web page "www.yoursite.com" responsive to the partial query "y" is displayed as the first result 412 and automatically populated 414 into the omnibox 406. In step 306, before the user completes and submits the query in the omnibox 406, the web browser 222 requests a copy of "www.yoursite.com" from a corresponding server hosting the web page.

Figure 4B:
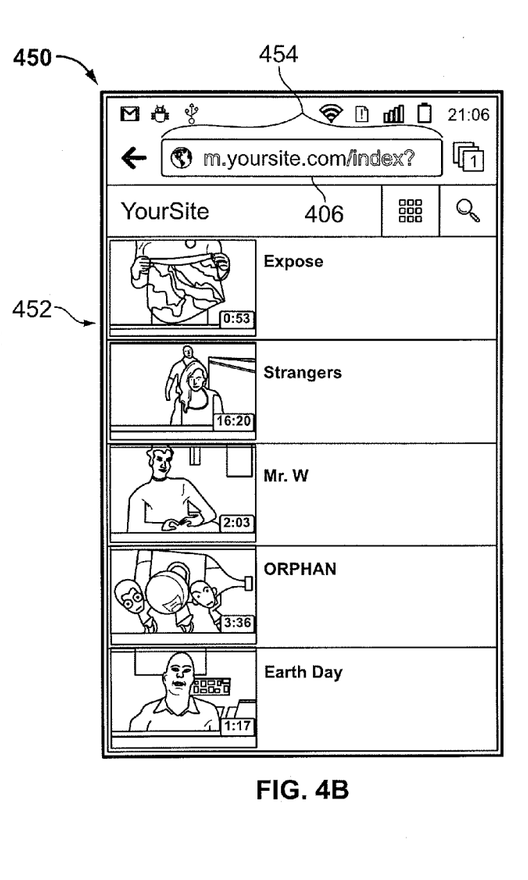

In step 307, the web browser 222 on the client 110 downloads and renders a copy of the responsive web page 224a for "www.yoursite.com," which is "m.yoursite.com/index" 224b. The user, who has not completed and submitted a query, identifies "www.yoursite.com" 412 from the list 410 and already suggested 414 by the web browser 222 into the omnibox 406 as the responsive web page to the user's intended query. In step 308, the user presses the "Go" button 416, thereby submitting the omnibox suggestion 414 of "yoursite.com" to the web browser 222 as the user's completed query. The pre-loaded and pre-rendered "m.yoursite.com/index" 224b, which is responsive to the submitted query, is then displayed in the web browser 222 in step 309 as illustrated in FIG. 4B, a screenshot 450 of the "m.yoursite.com/index" web page 224b after it is loaded in the web browser 222. The displayed web page 452 includes a URL identification 454 of the web page responsive to the user's completed query in the omnibox 406. The display of the web page 224b in the web browser 222 in step 309 is nearly instant, thereby making it appear to the user that the connection speed of the smartphone 110 and/or the processing speed of the web browser 222 is very fast. The web browser 222 can optionally display an indicator to the user indicating the web page 224b was loaded. The optional indicator indicates to the user that the web page was loaded in response to the user's query, and is not a version of the web page from a previous user request. The process 300 then ends.

Figure 5:
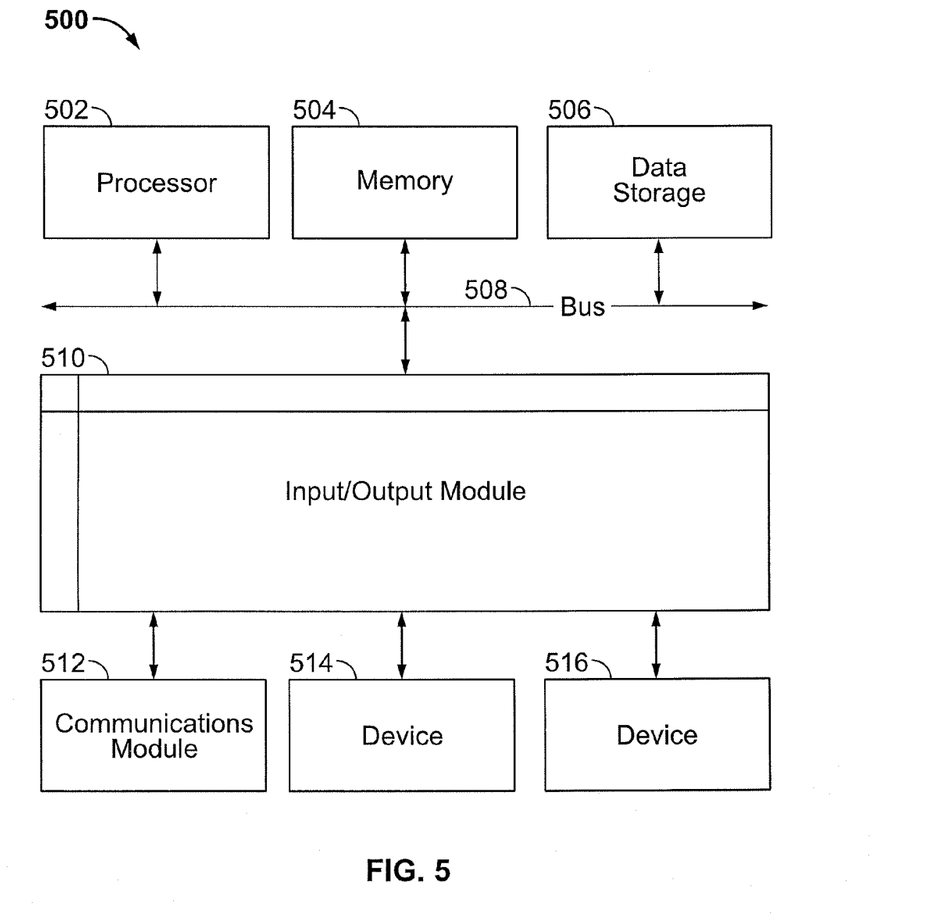
FIG. 5 is a block diagram illustrating an exemplary computer system with which the clients and server of FIG. 2 can be implemented.

FIG. 5 is a block diagram illustrating an exemplary computer system 500 with which the client 110 and server 130 of FIG. 2 can be implemented. In certain aspects, the computer system 500 may be implemented using hardware or a combination of software and hardware, either in a dedicated server, or integrated into another entity, or distributed across multiple entities.

Computer system 500 (e.g., client 110 and server 130) includes a bus 508 or other communication mechanism for communicating information, and a processor 502 processor 212 and 236) coupled with bus 508 for processing information. By way of example, the computer system 500 may be implemented with one or more processors 502. Processor 502 may be a general-purpose microprocessor, a microcontroller, a Digital Signal Processor (DSP), an Application Specific Integrated Circuit (ASIC), a Field Programmable Gate Army (FPGA), a Programmable Logic Device (PLD), a controller, a state machine, gated logic, discrete hardware components, or any other suitable entity that can perform calculations or other manipulations of information.

Computer system 500 can include, in addition to hardware, code that creates an execution environment for the computer program in question, e.g., code that constitutes processor firmware, a protocol stack, a database management system, an operating system, or a combination of one or more of them stored in an included memory 504 (e.g., memory 220 and 232), such as a Random Access Memory (RAM), a flash memory, a Read Only Memory (ROM), a Programmable Read-Only Memory (PROM), an Erasable PROM (EPROM), registers, a hard disk, a removable disk, a CD-ROM, a DVD, or any other suitable storage device, coupled to bus 508 for storing information and instructions to be executed by processor 502. The processor 502 and the memory 504 can be supplemented by, or incorporated in, special purpose logic circuitry.

The instructions may be stored in the memory 504 and implemented in one or more computer program products, i.e., one or more modules of computer program instructions encoded on a computer readable medium for execution by, or to control the operation of, the computer system 500, and according to any method well known to those of skill in the art, including, but not limited to, computer languages such as data-oriented languages (e.g., SQL, dBase), system languages C, Objective-C, C++, Assembly), architectural languages (e.g., Java, .NET), and application languages (e.g., PHP, Ruby, Perl, Python). Instructions may also be implemented in computer languages such as array languages, aspect-oriented languages, assembly languages, authoring languages, command line interface languages, compiled languages, concurrent languages, curly-bracket languages, dataflow languages, data-structured languages, declarative languages, esoteric languages, extension languages, fourth-generation languages, functional languages, interactive mode languages, interpreted languages, iterative languages, list-based languages, little languages, logic-based languages, machine languages, macro languages, metaprogramming languages, multiparadigm languages, numerical analysis, non-English-based languages, object-oriented class-based languages, object-oriented prototype-based languages, offside rule languages, procedural languages, reflective languages, rule-based languages, scripting languages, stack-based languages, synchronous languages, syntax handling languages, visual languages, wirth languages, and xml-based languages. Memory 504 may also be used for storing temporary variable or other intermediate information during execution of instructions to be executed by processor 502.

A computer program as discussed herein does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network. The processes and logic flows described in this specification can be performed by one or more programmable processors executing one or more computer programs to perform functions by operating on input data and generating output.

Computer system 500 further includes a data storage device 506 such as a magnetic disk or optical disk, coupled to bus 508 for storing information and instructions. Computer system 500 may be coupled via input/output module 510 to various devices. The input/output module 510 can be any input/output module. Exemplary input/output modules 510 include data ports such as USB ports. The input/output module 510 is configured to connect to a communications module 512. Exemplary communications modules 512 (e.g., communications modules 218 and 238) include networking interface cards, such as Ethernet cards and modems. In certain aspects, the input/output module 510 is configured to connect to a plurality of devices, such as an input device 514 (e.g., input device 216) and/or an output device 516 (e.g., output device 214). Exemplary input devices 514 include a keyboard and a pointing device, e.g., a mouse or a trackball, by which a user can provide input to the computer system 500. Other kinds of input devices 514 can be used to provide for interaction with a user as well, such as a tactile input device, visual input device, audio input device, or brain-computer interface device. For example, feedback provided to the user can be any form of sensory feedback, e.g., visual feedback, auditory feedback, or tactile feedback; and input from the user can be received in any form, including acoustic, speech, tactile, or brain wave input. Exemplary output devices 516 include display devices, such as a CRT (cathode ray tube) or LCD (liquid crystal display) monitor, for displaying information to the user.

According to one aspect of the present disclosure, the clients 110 and server 130 can be implemented using a computer system 500 in response to processor 502 executing one or more sequences of one or more instructions contained in memory 504. Such instructions may be read into memory 504 from another machine-readable medium, such as data storage device 506. Execution of the sequences of instructions contained in main memory 504 causes processor 502 to perform the process steps described herein. One or more processors in a multi-processing arrangement may also be employed to execute the sequences of instructions contained in memory 504. In alternative aspects, hard-wired circuitry may be used in place of or in combination with software instructions to implement various aspects of the present disclosure. Thus, aspects of the present disclosure are not limited to any specific combination of hardware circuitry and software.

Various aspects of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. The communication network (e.g., network 150) can include, for example, any one or more of a personal area network (PAN), a local area network (LAN), a campus area network (CAN), a metropolitan area network (MAN), a wide area network (WAN), a broadband network (BBN), the Internet, and the like. Further, the communication network can include, but is not limited to, for example, any one or more of the following network topologies, including a bus network, a star network, a ring network, a mesh network, a star-bus network, tree or hierarchical network, or the like. The communications modules can be, for example, modems or Ethernet cards.

Computing system 500 can include clients and servers. A client and server are generally remote from each other and typically interact through a communication network. The relationship of client and server arises by virtue of computer programs running on the respective computers and having a client-server relationship to each other. Computer system 500 can be, for example, and without limitation, a desktop computer, laptop computer, or tablet computer. Computer system 500 can also be embedded in another device, for example, and without limitation, a mobile telephone, a personal digital assistant (PDA), a mobile audio player, a Global Positioning System (GPS) receiver, a video game console, and/or a television set top box.

The term "machine-readable storage medium" or "computer readable medium" as used herein refers to any medium or media that participates in providing instructions to processor 502 for execution. Such a medium may take many forms, including, but not limited to, non-volatile media, volatile media, and transmission media. Non-volatile media include, for example, optical or magnetic disks, such as data storage device 506. Volatile media include dynamic memory, such as memory 504. Transmission media include coaxial cables, copper wire, and fiber optics, including the wires that comprise bus 508. Common forms of machine-readable media include, for example, floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, or any other medium from which a computer can read. The machine-readable storage medium can be a machine-readable storage device, a machine-readable storage substrate, a memory device, a composition of matter effecting a machine-readable propagated signal, or a combination of one or more of them.

Systems, methods, and machine-readable media for preloading a web page in a mobile web browser have been described. The disclosed web browser receives a partial or complete query from a user and identifies one or many web pages responsive to the query. Before the user has completed and submitted the query, the web browser predicts, downloads, and renders at least one web page responsive to the partial or complete query in the background. When the user completes and submits the query, the responsive web page has already been pre-loaded and pre-rendered in the background by the web browser. Thus, after the query is completed and submitted, the responsive web page is displayed to the user nearly instantly in the web browser when the responsive web page matches the submitted query.

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products.

The subject matter of this specification has been described in terms of particular aspects, but other aspects can be implemented and are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous. Other variations are within the scope of the following claims.

These and other implementations are within the scope of the following claims.

What is claimed is:

1. A computer-implemented method for pre-loading a web page in a mobile web browser, the method comprising:
   receiving a partial or complete query in a mobile web browser from a mobile device prior to the partial or complete query being submitted by a user;
   receiving an identification of a predicted web page responsive to the partial or complete query;
   downloading but not rendering the predicted web page prior to the partial or complete query being submitted by the user; and
   displaying the downloaded predicted web page in the mobile web browser after the completed query is submitted by the user when the predicted web page is determined to be responsive to the submitted query,
   wherein the predicted web page is not downloaded prior to the completing and submitting the query when the predicted web page is designated as a web page excluded from pre-loading.

2. The computer-implemented method of claim 1, wherein the predicted web page is rendered after downloading and prior to the completing and submitting the query for downloading and rendering the predicted web page in the mobile web browser.

3. The computer-implemented method of claim 1, further comprising:
   receiving an identification of additional predicted web pages responsive to the partial or complete query; and
   downloading at least a subset of the additional predicted web pages prior to the completing and submitting the query for downloading and rendering the predicted web page in the mobile web browser.

4. The computer-implemented method of claim 1, wherein the predicted web page is downloaded over a network connection, and wherein the predicted web page is downloaded prior to the completing and submitting the query if the network connection comprises a wireless local area network or a predetermined type of mobile data telecommunication network pricing plan.

5. The computer-implemented method of claim 1, wherein the predicted web page being designated as a web page excluded from pre-loading is based on at least one of the web page comprising information not designated for public display, the web page comprising malicious content, or the web page being designated by the user as being excluded from pre-loading.

6. The computer-implemented method of claim 1, wherein the predicted web page is downloaded prior to the completing and submitting the query if a memory requirement for downloading the predicted web page is below a pre-determined limit.

7. The computer-implemented method of claim 1, wherein when the predicted web page comprises active content, activation of the active content is delayed until after the predicted web page is displayed.

8. A system for pre-loading a web page in a mobile web browser, the system comprising:
   a memory for storing a predicted web page responsive to a partial or complete query received in a mobile web browser from a mobile device; and
   a processor configured to:
      receive an identification of the predicted web page as responsive to the partial or complete query;
      download but not render the predicted web page from a server based on the prediction prior to the query being completed and submitted; and
      display the downloaded predicted web page in the mobile web browser after the completed query is submitted by a user when the predicted web page is determined to be responsive to the submitted query,
   wherein the predicted web page is not downloaded prior to the completing and submitting the query when the predicted web page is designated as a web page excluded from pre-loading.

9. The system of claim 8, wherein the processor is further configured to render the predicted web page after downloading and prior to the completing and submitting the query for downloading and rendering the predicted web page in the mobile web browser.

10. The system of claim 8, wherein the processor is further configured to:
    receive an identification of additional predicted web pages responsive to the partial or complete query; and
    download at least a subset of the additional predicted web pages prior to the completing and submitting the query for loading and rendering the predicted web page in the mobile web browser.

11. The system of claim 8, wherein the processor is further configured to download the predicted web page from the server over a network connection, and wherein the processor being configured to download the predicted web page prior to the completing and submitting the query comprises the processor being configured to download the predicted web page prior to the completing and submitting the query if the network connection comprises a wireless local area network or predetermined type of mobile data telecommunication network pricing plan.

12. The system of claim 8, wherein the predicted web page being designated as a web page excluded from pre-loading is based on at least one of the web page comprising information not designated for public display, the web page comprising malicious content, or the web page being designated by the user as being excluded from pre-loading.

13. The system of claim 8, wherein the processor being configured to download the predicted web page prior to the completing and submitting the query comprises the processor being configured to download the predicted web page prior to the completing and submitting the query if a memory requirement for downloading the predicted web page is below a pre-determined limit.

14. The system of claim 8, wherein the processor being configured to display the downloaded and rendered comprises the processor being configured to delayed activation of active content for the predicted web page until after the predicted web page is displayed when the predicted web page comprises active content.

15. A mobile web browser for pre-loading a web page in a mobile web browser, the mobile web browser comprising:
    an input field configured to receive, from a mobile device including a processor, a submission of a partial or complete query for a web page for downloading and rendering the predicted web page; and
    a web page display area configured to display a web page, wherein the mobile web browser is configured to receive an identification of a predicted web page responsive to the partial or complete query prior to the partial or complete query being submitted by a user, download but not render the predicted web page based on the prediction prior to the query being completed and submitted, and display the downloaded predicted web page in the predicted web page display area after the completed query is submitted by the user to the input field when the predicted web page is determined to be responsive to the submitted query, and wherein the mobile web browser is configured to not download the predicted web page prior to the completing and submitting the query when the predicted web page is designated as a web page excluded from pre-loading.

16. The mobile web browser of claim 15, wherein the predicted web page is rendered by the mobile web browser after downloading and prior to the completing and submitting the query for downloading and rendering the predicted web page to the input field.

17. The mobile web browser of claim 15, wherein the mobile web browser is further configured to receive an identification of additional predicted web pages responsive to the partial or complete query, and download at least a subset of the additional predicted web pages prior to the completing and submitting the query for downloading and rendering the predicted web page to the input field.

18. The mobile web browser of claim 15, wherein the mobile web browser is configured to download the predicted web page over a network connection, and wherein the mobile web browser is configured to download the predicted web page prior to the completing and submitting the query if the network connection comprises a wireless local area network or a predetermined type of mobile data telecommunication network pricing plan.

19. The mobile web browser of claim 15, wherein the predicted web page being designated as a web page excluded from pre-loading is based on at least one of the web page comprising information not designated for public display, the web page comprising malicious content, or the web page being designated by the user as being excluded from pre-loading.

20. The mobile web browser of claim 15, wherein the mobile web browser is configured to download the predicted web page prior to the completing and submitting the query if a memory requirement for downloading the predicted web page is below a pre-determined limit.

21. The mobile web browser of claim 15, wherein when the predicted web page comprises active content, the mobile web browser is configured to delay activation of the active content until after the mobile web browser displays the predicted web page.

22. A non-transitory machine-readable storage medium comprising machine-readable instructions for causing a processor to execute a method for pre-loading a web page in a mobile web browser, the method comprising:

receiving a query in a mobile web browser from a mobile device prior to the query being submitted by a user;

receiving an identification of at least one predicted web page responsive to the query;

downloading and rendering the at least one identified web page based on the prediction prior to the query being completed and submitted; and displaying the downloaded and rendered at least one predicted web page in the mobile web browser after the completed query is submitted by the user when the predicted web page is determined to be responsive to the submitted query, wherein the predicted web page is not downloaded prior to the completing and submitting the query when the predicted web page is designated as a web page excluded from pre-loading.

* * * * *